United States Patent
Kitamura

(10) Patent No.: US 11,091,385 B2
(45) Date of Patent: Aug. 17, 2021

(54) METHOD FOR MANUFACTURING OPTICAL FIBER

(71) Applicant: FUJIKURA LTD., Tokyo (JP)

(72) Inventor: Takayuki Kitamura, Chiba (JP)

(73) Assignee: Fujikura Ltd., Tokyo (JP)

( * ) Notice: Subject to any disclaimer, the term of this patent is extended or adjusted under 35 U.S.C. 154(b) by 286 days.

(21) Appl. No.: 16/329,164

(22) PCT Filed: Apr. 28, 2017

(86) PCT No.: PCT/JP2017/016972
§ 371 (c)(1),
(2) Date: Feb. 27, 2019

(87) PCT Pub. No.: WO2018/042758
PCT Pub. Date: Mar. 8, 2018

(65) Prior Publication Data
US 2019/0185365 A1    Jun. 20, 2019

(30) Foreign Application Priority Data

Aug. 30, 2016  (JP) .............................. JP2016-168374

(51) Int. Cl.
*C03B 37/027*    (2006.01)
*G02B 6/02*    (2006.01)
*C03C 25/002*    (2018.01)

(52) U.S. Cl.
CPC ...... *C03B 37/02727* (2013.01); *C03B 37/027* (2013.01); *C03C 25/002* (2013.01);
(Continued)

(58) Field of Classification Search
None
See application file for complete search history.

(56) References Cited

U.S. PATENT DOCUMENTS

| 7,677,060 | B2 | 3/2010 | Oku et al. |
| 2001/0006262 | A1 | 7/2001 | Dubois et al. |

(Continued)

FOREIGN PATENT DOCUMENTS

| CN | 1343893 A | 4/2002 |
| EP | 2899168 A1 | 7/2015 |

(Continued)

OTHER PUBLICATIONS

K. Saito, et. al.; "Control of Glass-Forming Process During Fiber-Drawing to Reduce the Rayleigh Scattering Loss"; Journal of the American Ceramic Society, vol. 89, pp. 65-69, 2016 (5 Pages).

(Continued)

*Primary Examiner* — Lisa L Herring
(74) *Attorney, Agent, or Firm* — Osha Bergman Watanabe & Burton LLP

(57) ABSTRACT

A method for manufacturing an optical fiber includes: drawing an optical fiber from an optical fiber preform in a drawing furnace; and cooling the optical fiber in an annealing furnace. When the optical fiber enters the annealing furnace, a temperature difference between a temperature of the optical fiber and a fictive temperature of glass in a core of the optical fiber is 300° C. or less. The optical fiber is cooled for 0.01 seconds or more in the annealing furnace so that the temperature of the optical fiber becomes 1300° C. or more and 1800° C. or less.

8 Claims, 5 Drawing Sheets

(52) U.S. Cl.
CPC ........... *G02B 6/02* (2013.01); *G02B 6/02395* (2013.01); *C03B 2205/56* (2013.01); *C03B 2205/72* (2013.01)

(56) References Cited

U.S. PATENT DOCUMENTS

| | | | |
|---|---|---|---|
| 2005/0259932 A1 | 11/2005 | Nagayama et al. | |
| 2015/0251945 A1* | 9/2015 | Nakanishi | C03B 37/02727 65/435 |
| 2016/0168008 A1* | 6/2016 | Bookbinder | C03B 37/025 428/364 |
| 2017/0073265 A1* | 3/2017 | Bookbinder | C03B 37/02727 |
| 2017/0203996 A1* | 7/2017 | Kitamura | C03B 37/02727 |
| 2018/0194666 A1* | 7/2018 | Kitamura | C03B 37/032 |
| 2018/0290914 A1* | 10/2018 | Kitamura | C03B 37/027 |

FOREIGN PATENT DOCUMENTS

| | | |
|---|---|---|
| GN | 1348432 A | 5/2002 |
| GN | 104661975 A | 5/2015 |
| GN | 105593178 A | 5/2016 |
| JP | 2006-058494 A | 3/2006 |
| JP | 2007-238354 A | 9/2007 |
| JP | 2014-062021 A | 4/2014 |
| JP | 2015010877 A | 1/2015 |
| WO | 2017/044543 A1 | 3/2017 |

OTHER PUBLICATIONS

International Search Report issued in PCT/JP2017/016972 dated Aug. 8, 2017 (2 Pages).
Representation for Opposition to Grant of Patent issued in corresponding Indian application No. 201947010538, dated Jan. 22, 2020 (10 pages).

* cited by examiner

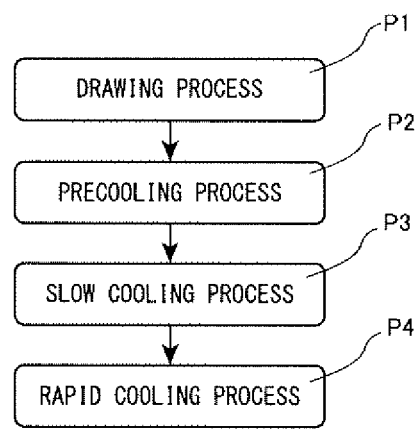
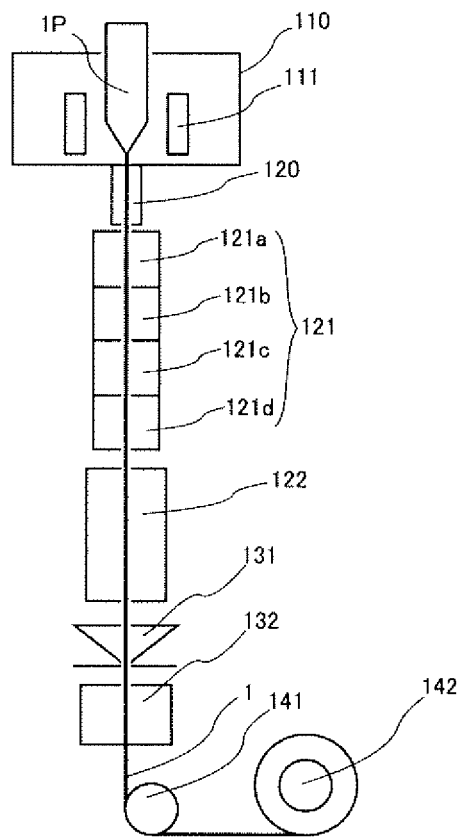

METHOD FOR MANUFACTURING OPTICAL FIBER

BACKGROUND

Technical Field

The present invention relates to a method for manufacturing an optical fiber.

Background Art

In optical fiber communication systems, in order to increase the reach and the rate of optical transmission, the optical signal-to-noise ratio has to be increased. Thus, a decrease in transmission losses in optical fibers is demanded. Nowadays, since a method for manufacturing an optical fiber is highly sophisticated transmission losses caused by impurities contained in optical fibers are closed to the lower limits. A remaining main cause of transmission losses is scattering losses in association with fluctuation in the structure or composition of glass forming optical fibers. This is inevitable, because optical fibers are formed of glass.

As a method of decreasing fluctuation in the structure of glass, a method is known to cool molten glass slowly. As a method of slowly cooling molten glass, an attempt is made to slowly cool an optical fiber drawn from a drawing furnace immediately. Specifically, it is investigated to decrease the cooling rate of the optical fiber that an optical fiber drawn from a drawing furnace is heated in an annealing furnace immediately surrounded by a heat insulator.

Patent Literature 1 below discloses a method of setting the temperature of a heating furnace (an annealing furnace) is ±100° C. or less of the target temperature found by a recurrence formula in 70% or more of a region from a position at which the outer diameter of a silica based optical fiber having a core and a cladding becomes smaller than 500% of the final outer diameter to a position at which the temperature of the optical fiber is 1,400° C. Since the temperature history of the optical fiber is controlled in this manner, the fictive temperature of glass forming the optical fiber is decreased to reduce transmission losses. Herein, a fictive temperature, an indicator of fluctuation in glass, roughly corresponds to a temperature at which molten glass is cooled and loses fluidity to be substantially solidified. A fictive temperature of glass does not fall below the actual temperature of the glass. Having a low fictive temperature indicates that the glass has thermal fluctuation. When an optical fiber is prepared under ordinary drawing conditions which do not involve annealing, a fictive temperature of the optical fiber becomes higher than 1600° C.

[Patent Literature 1] JP2014-62021 A

However, the technique disclosed in Patent Literature 1 above is required to repeat complex calculations in order to adjust the temperature of the optical fiber to an ideal temperature change found by the recurrence formula. The technique disclosed in Patent Literature 1 permits the temperature of the optical fiber to have a temperature shift of as large as ±50° C. to ±100° C. with respect to the target temperature found by the recurrence formula. When the temperature shift of the optical fiber is permitted in such a large deviation, it is difficult to say that the temperature history is sufficiently optimized. For example, supposing that the temperature of the optical fiber slowly cooled is changed in a range of ±100° C. and the fictive temperature of glass forming the optical fiber is also changed in a similar range, and supposing that this case only yields an optical fiber having a fictive temperature of 100° C. higher than a fictive temperature attainable based on a target temperature obtained by a recurrence formula, transmission losses of the obtained optical fiber caused by light scattering increase as large as about 0.007 dB/km. In such the disclosed production methods in which the temperature history of the optical fiber is not sufficiently optimized, the annealing furnace is elongated more than necessary, resulting in excessive capital investment, or the drawing rate is decreased more than necessary, resulting in degraded productivity.

SUMMARY

The inventors have found that appropriate slow cooling conditions make it possible to easily decrease a fictive temperature of glass included in an optical fiber, to promote structural relaxation in the glass included in a core of the optical fiber, and to facilitate reduction in transmission loss due to light scattering of the optical fiber.

Therefore, one or more embodiments of the present invention provide a method for manufacturing an optical fiber that easily reduces transmission losses in the optical fiber.

A method for manufacturing an optical fiber according to one or more embodiments of the present invention involves: a drawing process of drawing an optical fiber from an optical fiber preform in a drawing furnace; and a slow cooling process of slowly cooling the optical fiber drawn in the drawing process in an annealing furnace, wherein a temperature difference between a temperature of the optical fiber being drawn in the annealing furnace and a fictive temperature of glass included in a core of the optical fiber may be 300° C. or less, or may be 180° C. or less, and the optical fiber is slowly cooled for 0.01 seconds or more in the annealing furnace to cause the optical fiber to have a temperature of 1300° C. or more and 1800° C. or less.

The inventors have found the following facts in regard to a relationship between slow cooling conditions of the optical fiber and transmission loss of the optical fiber. In other words, the inventors have found that when the optical fiber is slowly cooled for 0.01 seconds or more to cause the optical fiber to have a temperature of 1300° C. or more and 1800° C. or less, causing the temperature difference between the temperature of the optical fiber at the start of annealing and the fictive temperature of the glass included in the core of the optical fiber to be 300° C. or less, it is possible to promote structural relaxation in the glass included in the core. Furthermore, the inventors have found that the temperature difference may be 180° C. or less in order to further promote the structural relaxation in the glass included in the core. Accordingly, even though there is a certain amount of variation in the temperature of the optical fiber at the start of annealing and the fictive temperature of the glass included in the core of the optical fiber, it is possible to promote the structural relaxation in the glass included in the core. Promotion of the structural relaxation in the glass included in the core reduces scattering loss due to structural fluctuation in the glass included in the core when light is transmitted to the core, leading to reduction in transmission loss of the optical fiber.

In addition, when the temperature difference between the temperature of the optical fiber being drawn in the annealing furnace and the fictive temperature of the glass included in the core of the optical fiber is 0° C. or more and 60° C. or less, it is possible to set a preset temperature of the annealing furnace to a temperature lower than the temperature of the optical fiber. When the temperature difference between the temperature of the optical fiber being drawn in the annealing furnace and the fictive temperature of the glass included in the core of the optical fiber is higher than 60° C. and equal to 300° C. or less, it is possible to temporarily increase the temperature of the optical fiber and then decrease the temperature in the annealing furnace.

When the temperature difference between the temperature of the optical fiber being drawn in the annealing furnace and the fictive temperature of the glass included in the core of the optical fiber is 0° C. or more and 60° C. or less, monotonically decreasing the temperature of the optical fiber makes it possible to efficiently decrease the fictive temperature of the glass included in the core of the optical fiber. On the other hand, when the temperature difference between the temperature of the optical fiber being drawn in the annealing furnace and the fictive temperature of the glass included in the core of the optical fiber is higher than 60° C. and equal to 300° C. or less, temporarily increasing and then decreasing the temperature of the optical fiber makes it possible to efficiently decrease the fictive temperature of the glass included in the core of the optical fiber.

In addition, when the temperature difference between the temperature of the optical fiber being drawn in the annealing furnace and the fictive temperature of the glass included in the core of the optical fiber is higher than 60° C. and equal to 180° C. or less, it is possible to increase the temperature of the optical fiber to a preset temperature of the annealing furnace within a time range from 0.001 to 0.1 seconds after the optical fiber is drawn in the annealing furnace and then decreased.

When the temperature of the optical fiber to be drawn in the annealing furnace is low, an increase in temperature of the optical fiber in such a short time makes it possible to efficiently decrease the fictive temperature of the glass included in the core of the optical fiber.

Furthermore, the optical fiber may be slowly cooled in the annealing furnace for 0.1 seconds or more.

Slow cooling of the optical fiber for 0.1 seconds or more makes it easier to promote the structural relaxation in the glass included in the core regardless of variation in the temperature of the optical fiber at the start of slow cooling and the fictive temperature of the glass included in the core of the optical fiber.

The optical fiber may be slowly cooled in the annealing furnace for 0.02 seconds or more so that the temperature of the optical fiber becomes 1450° C. or more and 1630° C. or less. The optical fiber may be slowly cooled in the annealing furnace for 0.1 seconds or more so that the temperature of the optical fiber becomes 1350° C. or more and 1500° C. or less.

In this manner, slow cooling of the optical fiber makes it easier to promote the structural relaxation in the glass included in the core regardless of variation in the temperature of the optical fiber at the start of slow cooling and the fictive temperature of the glass included in the core of the optical fiber.

As described above, one or more embodiments of the present invention provide a method for manufacturing an optical fiber which facilitates reduction in transmission loss of an optical fiber.

BRIEF DESCRIPTION OF THE DRAWINGS

FIG. 1 is a flowchart of the processes of a method for manufacturing an optical fiber according to one or more embodiments of the present invention.

FIG. 2 is a schematic diagram of the configuration of devices for use in a method for manufacturing an optical fiber according to one or more embodiments of the present invention.

DETAILED DESCRIPTION

Figure 3:
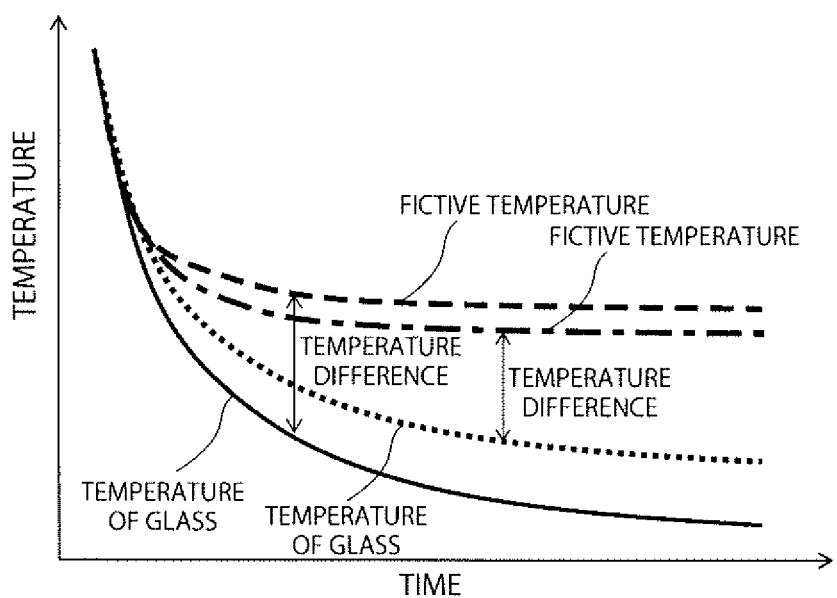
FIG. 3 is a graph of the relationship of the temperature of glass and the fictive temperature of the glass with slow cooling time according to one or more embodiments.

In the following, one or more embodiments of a method for manufacturing an optical fiber according to the present invention will be described in detail with reference to the drawings.

FIG. 1 is a flowchart of the processes of a method for manufacturing an optical fiber according to one or more embodiments of the present invention. As illustrated in FIG. 1, the method for manufacturing an optical fiber according to one or more embodiments includes a drawing process P1, a precooling process P2, a slow cooling process P3, and a rapid cooling process P4. In the following, these processes will be described. Note that, FIG. 2 is a schematic diagram of the configuration of devices for use in the method for manufacturing an optical fiber according to one or more embodiments.

(Drawing Process P1)

The drawing process P1 is a process in which one end of an optical fiber preform 1P is drawn in a drawing furnace 110. First, the optical fiber preform 1P is prepared. The optical fiber preform 1P is formed of glass having refractive index profiles the same as the refractive index profiles of core and cladding forming a desired optical fiber 1. The optical fiber 1 includes one or a plurality of cores and a cladding surrounding the outer circumferential surface of the core with no gap. The core and the cladding are formed of silica glass. The refractive index of the core is higher than the refractive index of the cladding. For example, in the case in which the core is formed of silica glass doped with a dopant, such as germanium, which increases the refractive index, the cladding is formed of pure silica glass. For example, in the case in which the core is formed of pure silica glass, the cladding is formed of silica glass doped with a dopant, such as fluorine, which decreases the refractive index.

Subsequently, the optical fiber preform 1P is suspended so that the longitudinal direction is perpendicular. The optical fiber preform 1P is disposed in the drawing furnace 110, a heating unit 111 is caused to generate heat, and then the lower end portion of the optical fiber preform 1P is heated. At this time, the lower end portion of the optical fiber preform 1P is heated at a temperature of 2,000° C., for example, to be molten. From the heated lower end portion of the optical fiber preform 1P, molten glass is drawn out of the drawing furnace 110 at a predetermined drawing rate.

(Precooling Process P2)

The precooling process P2 is a process in which the optical fiber drawn out of the drawing furnace 110 in the drawing process P1 is cooled to a predetermined temperature suitable for delivering the optical fiber into an annealing furnace 121, described later.

In the method for manufacturing an optical fiber according to one or more embodiments, the precooling process P2 is performed by passing the optical fiber drawn in the drawing process P1 through the hollow portion of a tubular body 120 provided directly below the drawing furnace 110. The tubular body 120 is provided directly below the drawing furnace 110, causing the atmosphere in the inside of the hollow portion of the tubular body 120 to be almost the same as the atmosphere in the inside of the drawing furnace 110. Thus, a sudden change in the atmosphere and the temperature around the optical fiber immediately after drawn is reduced.

The temperature of the optical fiber delivered into the annealing furnace 121 is mainly determined by the drawing rate and the atmosphere inside the drawing furnace 110. The precooling process P2 is provided, which further finely adjusts the cooling rate of the optical fiber for easy adjustment of the incoming temperature of the optical fiber to be delivered into the annealing furnace 121 to a suitable range. Based on the temperature of the optical fiber to be drawn out of the drawing furnace 110 and the temperature of the optical fiber suitable for delivering the optical fiber into the annealing furnace 121, the distance from the annealing furnace 121 to the drawing furnace 110 and the length of the tubular body 120 can be appropriately selected. The tubular body 120 is formed of a metal tube, for example. The cooling rate of the optical fiber may be adjusted by air-cooling the metal tube or by providing a heat insulator around the metal tube.

(Slow Cooling Process P3)

In the slow cooling process P3, the optical fiber drawn out in the drawing process P1 is slowly cooled in the annealing furnace. In the method for manufacturing an optical fiber according to one or more embodiments, the temperature of the optical fiber is adjusted through the precooling process P2, and the optical fiber is slowly cooled in the slow cooling process P3. In the slow cooling process P3 of one or more embodiments, the optical fiber passes through a plurality of annealing furnaces 121a, 121b, 121c, and 121d. Hereinafter, when describing all these annealing furnaces or when there is no need to distinguish one annealing furnace from the others, the annealing furnaces may be referred to as "annealing furnace 121" collectively. Although FIG. 2 shows the four annealing furnaces 121a, 121b, 121c and 121d, in one or more embodiments of the present invention, the number of annealing furnaces is not particularly limited to four. However, the number of annealing furnaces may be plural. Being provided with a plurality of annealing furnaces indicates that the apparatus is provided with a plurality of heat generating units which may be set to different temperatures. For example, even though the plurality of heat generating units is provided in a housing, as long as those units are set to different temperatures, the apparatus is considered as having a plurality of annealing furnaces.

The temperature inside the annealing furnace 121 is set to a predetermined temperature different from the temperature of the to-be-drawn optical fiber. Accordingly, depending on the ambient temperature, the temperature of the optical fiber to enter the annealing furnace 121 is temporarily increased or the cooling rate is decreased. In the method for manufacturing an optical fiber according to one or more embodiments, as described below, annealing conditions of the optical fiber are appropriately set in the slow cooling process P3, which promotes structural relaxation in the glass included in the core of the optical fiber. Therefore, it is possible to obtain the optical fiber 1 having reduced transmission loss. Furthermore, the method for manufacturing an optical fiber according to one or more embodiments does not require complicated calculation at the time of manufacturing as the technique disclosed in Patent Literature 1.

In silica glass classified as what is called strong glass, a time constant $\tau(T_g)$ of structural relaxation which is thought to be caused by a viscous flow of glass is in accordance with the Arrhenius equation. Accordingly, the time constant $\tau(T_g)$ is expressed by the following Equation (1), as a function of a temperature $T_g$ of the glass, using a constant A and an activation energy $E_{act}$ determined by a composition of the glass. Note that $k_2$ is the Boltzmann constant.

$$1/\tau(T_g) = A \exp(-E_{act}/k_B T_g). \tag{1}$$

(Herein, $T_g$ is the absolute temperature of the glass.)

Equation (1) shows that the higher the temperature of the glass, the faster the glass structure is relaxed, and the faster the glass reaches a state of equilibrium. In other words, the higher the temperature of the glass, the faster the fictive temperature approaches the temperature of the glass.

FIG. 3 shows the relationship of the temperature of glass and the fictive temperature of the glass with time in slowly cooling glass. In the graph of FIG. 3, the horizontal axis expresses time, and the vertical axis expresses temperature. In FIG. 3, a solid line expresses the transition of the temperature of glass under certain slow cooling conditions, and a broken line expresses the transition of the fictive temperature of glass at that time. A dotted line expresses the transition of the temperature of glass in the case in which the cooling rate is decreased more slowly than the slow cooling conditions expressed by the solid line, and an alternate long and short dash line expresses the transition of the fictive temperature of glass at that time.

As expressed by the solid line and the broken line in FIG. 3, when the temperature of glass is decreased over a lapse of time in the high temperature area, the fictive temperature of glass is also similarly decreased. As described above, in the state in which the temperature of glass is sufficiently high, the rate of the relaxation of the structure of glass forming the optical fiber is very fast. However, as the temperature of glass is decreased, the rate of the relaxation of the structure of glass is decreased, and the fictive temperature of glass fails to follow a decrease in the temperature of glass after a while. The temperature difference between the temperature of glass and the fictive temperature of glass is increased. Here, when the cooling rate of glass is slowed, the optical fiber is held in a relatively higher temperature state for a longer time, compared with the case in which the cooling rate is faster. Thus, as expressed by the dotted line and the alternate long and short dash line in FIG. 3, the temperature difference between the temperature of glass and the fictive temperature of glass becomes smaller, and the fictive temperature of glass is lower than the example described above. That is, when the cooling rate of glass is slowed, the relaxation of the structure of glass is easily promoted.

As described above, when the temperature of glass is high, the structure of glass is relaxed fast. However, the fictive temperature of glass does not reach to the below of the temperature of glass. Thus, when the temperature of glass is high, the fictive temperature of the glass also remains high. That is, when the temperature of glass is too high, the effects obtained by slow cooling are poor. On the other hand, in the case in which the temperature of glass is low, the fictive temperature can be decreased to a lower temperature, but the decrease rate of the fictive temperature is slowed. That is, when the temperature of glass is too low, it will take longer time for slow cooling in order to sufficiently decrease the fictive temperature.

Based on the relationship between the temperature of the glass and the fictive temperature of the glass, hereinafter described is how the optical fiber is slowly cooled to promote the structural relaxation in the glass included in the core of the optical fiber and to reduce the transmission loss of the optical fiber. Hereinafter, suppose that the temperature of the optical fiber is uniform in a radial direction. In other words, the temperature of the optical fiber is equal to the temperature of the core included in the optical fiber.

A fictive temperature $T_f$ of the glass included in the core after a time $\Delta t$ from a certain point in the slow cooling process P3 is expressed by the following Equation (2) based on Equation (1), where $\tau(T_g)$ is a time constant of structural relaxation in the glass included in the core of the optical fiber, $T_g$ is a temperature of the optical fiber at the certain point, and $T_f^0$ is a fictive temperature of the glass included in the core at the certain point. Note that $\Delta t$ is a minute time. Suppose that $T_g$ during $\Delta t$ is constant.

$$T_f - T_g = (T_f^0 - T_g)\exp(-\Delta t/(T_g)) \quad (2)$$

Equation (2) shows that the fictive temperature $T_f$ of the glass included in the core after the time $\Delta t$ depends on the time constant $\tau(T_g)$ of the structural relaxation. Equation (2) also shows that a temperature difference $(T_f - T_g)$ between the fictive temperature $T_f$ of the glass included in the core after the time $\Delta t$ and the temperature $T_g$ of the optical fiber depends on a temperature difference $(T_f^0 - T_g)$ between the fictive temperature $T_f^0$ of the glass included in the core at a certain point before the time $\Delta t$ and the temperature $T_g$ of the optical fiber. The time constant $\tau(T_g)$ of the structural relaxation is defined as a time that elapses before the temperature difference $(T_f - T_g)$ between the fictive temperature $T_f$ of the glass and the temperature $T_g$ of the glass becomes 1/e when the glass having a fictive temperature of $T_f^0$ has a temperature of $T_g$. As the temperature difference $(T_f^0 - T_g)$ becomes large to some extent, the fictive temperature $T_f$ per unit time changes greatly.

Figure 4:
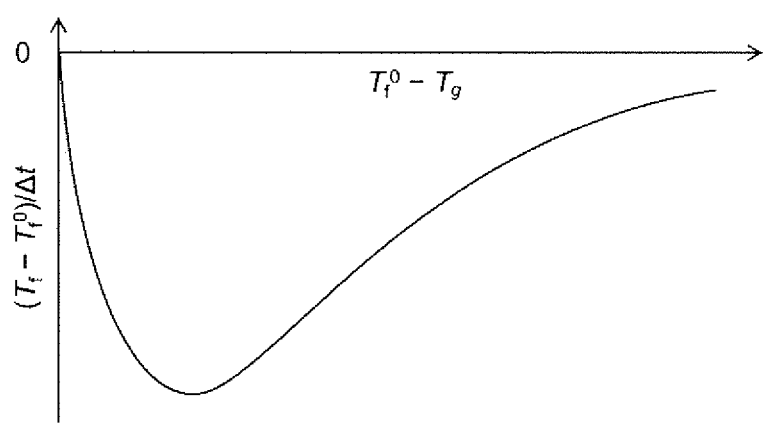
FIG. 4 is a graph of the relationship of the temperature difference ($T_f^0 - T$) between the fictive temperature of glass and the temperature of glass with the decrease rate ($(T_f - T_f^0)/\Delta t$) of the fictive temperature of glass per unit time, in a schematic manner according to one or more embodiments.

FIG. 4 shows a relationship between the changes in the fictive temperature $T_f$ per unit time $((T_f - T_f^0)/\Delta t)$ and the temperature difference $(T_f^0 - T_g)$ when the temperature of the optical fiber that includes the core including the glass having a fictive temperature of $T_f^0$ is set to $T_g$. As shown in FIG. 4, under the condition that the fictive temperature $T_f^0$ of the glass included in the core coincides with the temperature $T_g$ of the optical fiber $(T_f^0 = T_g)$, the structural relaxation in the glass included in the core does not occur, and the changes in the fictive temperature per unit time is 0 $((T_f - T_f^0)/\Delta t = 0)$. Considering the condition that the temperature $T_g$ of the optical fiber is decreased from this point and the temperature difference $\Delta T$ between the fictive temperature $T_f^0$ of the glass included in the core and the temperature $T_g$ of the optical fiber becomes large, the time constant $\tau(T_g)$ of the structural relaxation in the glass included in the core increases, but a rate of change $((T_f - T_f^0)/\Delta t)$ of the fictive temperature $T_f$ per unit time increases negatively. However, considering the condition that the temperature difference $(T_f^0 - T_g)$ between the fictive temperature $T_f^0$ of the glass included in the core and the temperature $T_g$ of the optical fiber further increases by further decreasing the temperature $T_g$ of the optical fiber, the time constant $\tau(T_g)$ of the structural relaxation in the glass included in the core gradually increases, and simultaneously, the absolute value of the changes in the fictive temperature $T_f$ per unit time $((T_f - T_f^0)/\Delta t)$ becomes small. In other words, as the downward peak shown in the graph of FIG. 4, when the temperature difference $(T_f^0 - T_g)$ between the fictive temperature $T_f^0$ of the glass included in the core and the temperature $T_g$ of the optical fiber is at a certain value, the changes in the fictive temperature per unit time $((T_f - T_f^0)/\Delta t)$ have a local minimum value.

Solution of Equation (2) shows that the relationship of the following Equation (3) holds between the temperature $T_g$ and the fictive temperature $T_f$ of the glass when the rate of decline in the fictive temperature $T^f$ of the glass reaches a peak.

$$T_g^2 + (E_{act}/k_B) \times T_g - (E_{act}/k_B) \times T_f = 0 \quad (3)$$

Solution of $T_g$ in Equation (3) as shown in the following Equation (4) makes it possible to obtain the temperature $T_g$ of the glass when the fictive temperature $T_f$ of the glass is reduced most efficiently.

$$T_g = \frac{-\frac{E_{act}}{k_B} + \sqrt{\left(\frac{E_{act}}{k_B}\right)^2 + 4\frac{E_{act}}{k_B}T_f}}{2} \quad (4)$$

As described, when the temperature difference $(T_f^0 - T_g)$ between the fictive temperature $T_f^0$ of the glass and the temperature $T_g$ of the glass at a certain point is at a predetermined value, the changes in the fictive temperature $T_f$ of the glass per unit time increases the most. In other words, when considering the fictive temperature $T_f$ of the glass having the fictive temperature $T_f^0$ after a certain period of time $\Delta t$, there is a temperature $T_g$ of the glass that allows the fictive temperature $T_f$ to be the lowest level. The temperature difference $(T_f^0 - T_g)$ when the changes in the fictive temperature $T_f$ of the glass per unit time reaches a peak is about 60° C.

Next, initial conditions as shown in Table 1 are set so that a fictive temperature $T_g$ does not fall below 1600° C. and the temperature difference $\Delta T^0$ between $T_f^0$ and $T_g^0$ increases with a decrease in $T_g^0$, where $T_g^0$ represents a temperature of the optical fiber being drawn in the annealing furnace 121 (t=0 (sec)), $T_f^0$ represents a fictive temperature of the glass included in the core of the optical fiber being drawn in the annealing furnace 121, and $\Delta T^0$ represents a temperature difference $(T_f^0 - T_g^0)$ between $T_g^0$ and $T_f^0$. The reason for setting the fictive temperature not below 1600° C. is that a fictive temperature of silica glass under ordinary drawing conditions which do not involve slow cooling drawing is higher than 1600° C. Time-dependent changes in the temperature $T_g$ of the optical fiber under the initial conditions are obtained in the following manner and shown in FIGS. 5 and 6, and time-dependent changes in the fictive temperature $T_f$ of the glass included in the core are obtained in the following manner and shown in FIGS. 7 and 8.

TABLE 1

|  | $T_g^0$ | $T_f^0$ | $\Delta T^0$ |
| --- | --- | --- | --- |
| CONDITION 1 | 1825 | 1825 | 0 |
| CONDITION 2 | 1760 | 1780 | 20 |
| CONDITION 3 | 1700 | 1740 | 40 |
| CONDITION 4 | 1645 | 1705 | 60 |
| CONDITION 5 | 1595 | 1675 | 80 |
| CONDITION 6 | 1550 | 1650 | 100 |
| CONDITION 7 | 1510 | 1630 | 120 |
| CONDITION 8 | 1475 | 1615 | 140 |
| CONDITION 9 | 1450 | 1610 | 160 |
| CONDITION 10 | 1425 | 1605 | 180 |
| CONDITION 11 | 1400 | 1600 | 200 |
| CONDITION 12 | 1380 | 1600 | 220 |
| CONDITION 13 | 1360 | 1600 | 240 |
| CONDITION 14 | 1340 | 1600 | 260 |
| CONDITION 15 | 1320 | 1600 | 280 |
| CONDITION 16 | 1300 | 1600 | 300 |

The fictive temperature $T_f$ of the glass included in the core of the optical fiber attainable after 0.0005 seconds ($\Delta t=0.0005$ (sec)) is obtained from Equation (2) based on the temperature $T_g^0$ of the optical fiber at the initial conditions (when t=0 (sec)) shown in Table 1 and based on the fictive temperature $T_f^0$ of the glass included in the core of the optical fiber. Next, an ideal temperature $T_g$ of the optical fiber that allows the fictive temperature $T_f$ to decrease most efficiently is obtained from Equation (4). Solving Equations (2) and (4), in order, under the condition of $\Delta t=0.0005$ (sec) makes it possible to obtain time-dependent changes in the temperature $T_g$ of the optical fiber and the fictive temperature $T_f$ of the glass included in the core. In regard to the constant A and the activation energy $E_{act}$ in Equations (1) and (3) necessary for solving Equations (2) and (4), one or more embodiments employ values described in Non-Patent Literature 1 (K. Saito, et al. Journal of the American Ceramic Society, Vol. 89, pp. 65-69 (2006)).

However, in actual slow cooling, the temperature $T_g$ of the optical fiber may not catch up with the ideal temperature changes obtained by the above calculation. Accordingly, the inventors set the upper limit of the temperature changes of the optical fiber during the time $\Delta t$. The upper limit is obtained from a temperature difference $(T_g^0 - T_g)$ based on the following Equation (5). In Equation (5), the temperature difference $(T_g^0 - T_g)$ when $\Delta t=0.0005$ (sec) is set to the upper limit of the temperature changes of the optical fiber so as to set a feasible condition for the temperature $T_g$ of the optical fiber. Herein, suppose that the temperature $T_g$ of the optical fiber having the temperature $T_g^0$ after $\Delta t$ is heated by radiation and conduction of a temperature $T_a$ from the annealing furnace 121, ignoring radiation from the atmospheric gas inside the annealing furnace 121, and suppose that the temperature of the optical fiber in the radial direction is uniform.

$$T_g^0 - T_g = 4\sigma_B \varepsilon (T_g^{04} - T_a^4) + \frac{h}{C_p \cdot \rho \cdot d}(T_g^0 - T_a) \cdot \Delta t \quad (5)$$

In Equation (5), $\sigma_B$ is the Stefan-Boltzmann constant, $\varepsilon$ is emissivity (0.95) of the silica glass included in the optical fiber, h is a convection heat transfer coefficient, $C_p$ is a heat capacity of the silica glass included in the optical fiber, $\rho$ is a density of the silica glass included in the optical fiber, and d is a diameter of the optical fiber.

Figure 5:
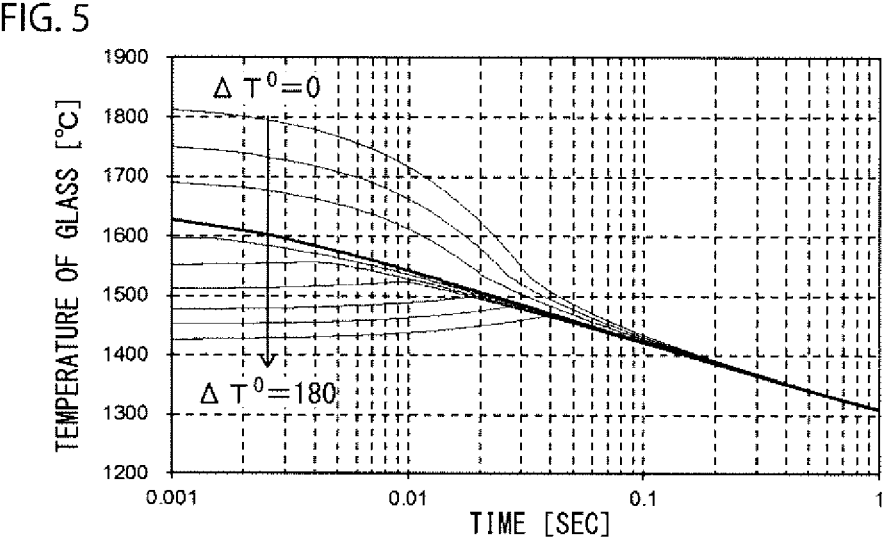
FIG. 5 is a graph of a time-dependent change in the temperature of an optical fiber in a case where the temperature difference between the temperature of the optical fiber entering an annealing furnace and the fictive temperature of the glass in the core of the optical fiber is 0° C. or more and 180° C. or less.
Figure 6:
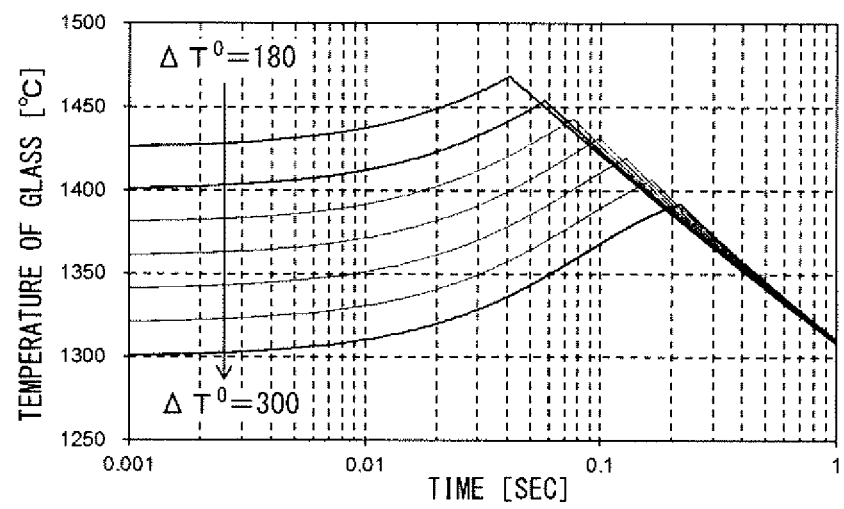
FIG. 6 is a graph of a time-dependent change in the temperature of the optical fiber in a case where the temperature difference between the temperature of the optical fiber entering the annealing furnace and the fictive temperature of the glass in the core of the optical fiber is 180° C. or more and 300° C. or less.
Figure 7:
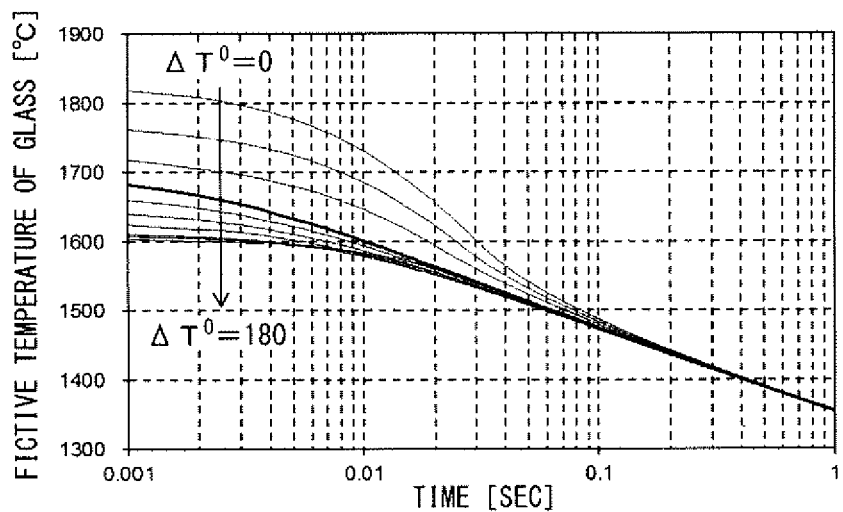
FIG. 7 is a graph of a time-dependent change in the fictive temperature of the glass in the optical fiber in a case where the temperature difference between the temperature of the optical fiber entering the annealing furnace and the fictive temperature of the glass in the core of the optical fiber is 0° C. or more and 180° C. or less.
Figure 8:
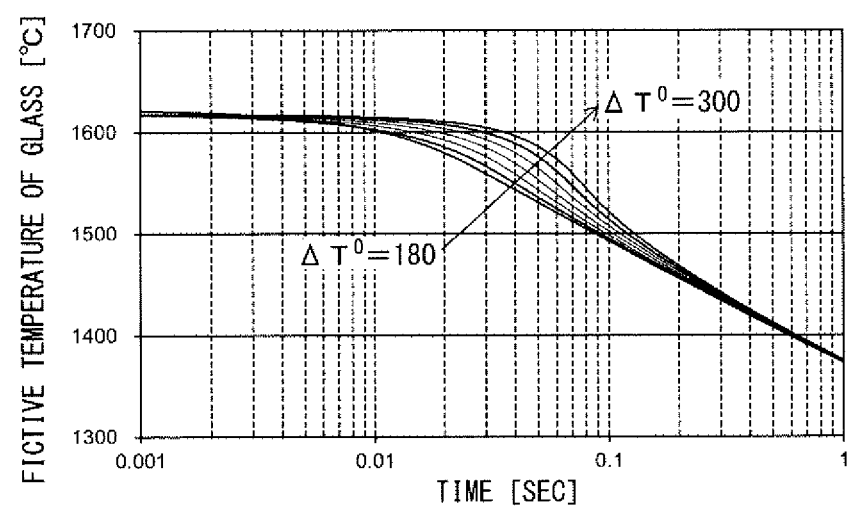
FIG. 8 is a graph of a time-dependent change in the fictive temperature of the glass included in the optical fiber in a case where the temperature difference between the temperature of the optical fiber entering the annealing furnace and the fictive temperature of the glass in the core of the optical fiber is 180° C. or more and 300° C. or less.

The results in FIGS. 5 to 8, which are obtained in the aforementioned manner, show the following facts. First, FIG. 7 and FIG. 8 show that whichever initial conditions may yield slow cooling conditions that monotonically decreases the fictive temperature $T_f$ of the glass included in the core. FIG. 7 shows that, under the condition that the temperature difference $\Delta T^0$ at the start of slow cooling is from 0° C. to 180° C., the lower the fictive temperature $T_f^0$ at the start of slow cooling becomes, the lower becomes the fictive temperature $T_f$ attainable by slow cooling. On the other hand, FIG. 8 shows that, under the condition that the fictive temperature $T_g^0$ at the start of slow cooling is equal to 1600° C. and the temperature difference $\Delta T^0$ at the start of slow cooling exceeds 180° C., the larger the temperature difference $\Delta T^0$ becomes, the longer the induction period becomes, indicating that the fictive temperature $T_f$ attainable by slow cooling becomes high. The induction period herein is a time that elapses before the fictive temperature $T_f$ decreases conspicuously.

In addition, as shown in FIG. 5, under the condition that the temperature difference $\Delta T^0$ at the start of slow cooling is from 0° C. to 60° C., when the temperature $T_g$ of the optical fiber monotonically decreases, the fictive temperature $T_f$ of the glass included in the core decreases most efficiently. Accordingly, when the temperature difference $\Delta T^0$ between the temperature $T_g^0$ of the optical fiber being drawn in the annealing furnace 121 and the fictive temperature $T_f^0$ of the glass included in the core of the optical fiber is 0° C. or more and 60° C. or less, it is possible that the preset temperature of the annealing furnace 121 should always be lower than the temperature of the optical fiber.

On the other hand, if the temperature difference $\Delta T^0$ at the start of slow cooling exceeds 60° C., as shown in FIGS. and 6, the fictive temperature $T_f$ decreases most efficiently under the condition that the temperature $T_g$ of the optical fiber increases immediately after the optical fiber is drawn in the annealing furnace and then decreases monotonically. Herein, the more the temperature difference $\Delta T^0$ increases, the more the time required for the temperature rise increases. In particular, as shown in FIG. 6, under the condition that $\Delta T^0$ exceeds 180° C., not only the time required for the temperature rise becomes longer but also a maximum temperature which $T_g$ reaches becomes higher than $T_g$ when $\Delta T^0$ is much lower at the same elapsed time. Accordingly, when the temperature difference $\Delta T^0$ between the temperature $T_g^0$ of the optical fiber being drawn in the annealing furnace 121 and the fictive temperature $T_f^0$ of the glass included in the core of the optical fiber is higher than 60° C., it is possible to temporarily increase and then decrease the temperature of the optical fiber in the annealing furnace 121. In a case where the temperature difference $\Delta T^0$ between the temperature $T_g^0$ of the optical fiber being drawn in the annealing furnace 121 and the fictive temperature $T_f^0$ of the glass included in the core of the optical fiber exceeds 180° C., such a case not only requires a longer time for increasing the temperature of the optical fiber in the annealing furnace 121 but also requires a longer time for decreasing the fictive temperature to be approximately equal to the level in a case where the temperature difference $\Delta T^o$ is 60° C. On the other hand, when the temperature difference $\Delta T^o$ is higher than 60° C. and equal to 180° C. or less, temporarily increasing and then decreasing the temperature of the optical fiber in the annealing furnace 121 makes it possible to decrease the fictive temperature, within the same time, to be approximately equal to the level in the case where the temperature difference $\Delta T^o$ is 60° C. In this manner, when reheating the optical fiber in the annealing furnace 121, Equation (5) is calculated, provided that the temperature $T_a$ of the annealing furnace 121 is set 100° C. higher than the temperature $T_g^o$ of the optical fiber at the start of slow cooling. As shown in FIG. 5 and FIG. 6, the larger the temperature difference $\Delta T^o$ at the start of slow cooling becomes, the longer becomes the time required for reheating the optical fiber, which greatly increases the temperature of the optical fiber. For example, under the condition of $\Delta T^o=180°$ C., $T_g^o=1425°$ C., and $T_f^o=1605°$ C., increasing the temperature $T_g$ of the optical fiber to about 1450° C. by heating the optical fiber for about 0.04 seconds decreases the temperature difference $(T_f-T_g)$ to about 53° C., and thereafter, the fictive temperature $T_f$ monotonously and gradually decreases as in a case where the temperature difference $\Delta T^o$ at the start of slow cooling is 60° C. or less. Under the condition of $\Delta T^o=240°$ C., $T_g^o=1360°$ C., and $T_f^o=1600°$ C., increasing the temperature $T_g$ of the optical fiber to about 1432° C. by heating the optical fiber for about 0.1 seconds decreases the temperature difference $(T_f-T_g)$ to about 54° C. However, it is necessary to overheat the optical fiber to a temperature 10° C. higher than the temperature $T_g=1422°$ C. of the optical fiber after 0.1 seconds when $\Delta T^o=60°$ C., and the fictive temperature $T_f$ also becomes 10° C. higher.

Figure 9:
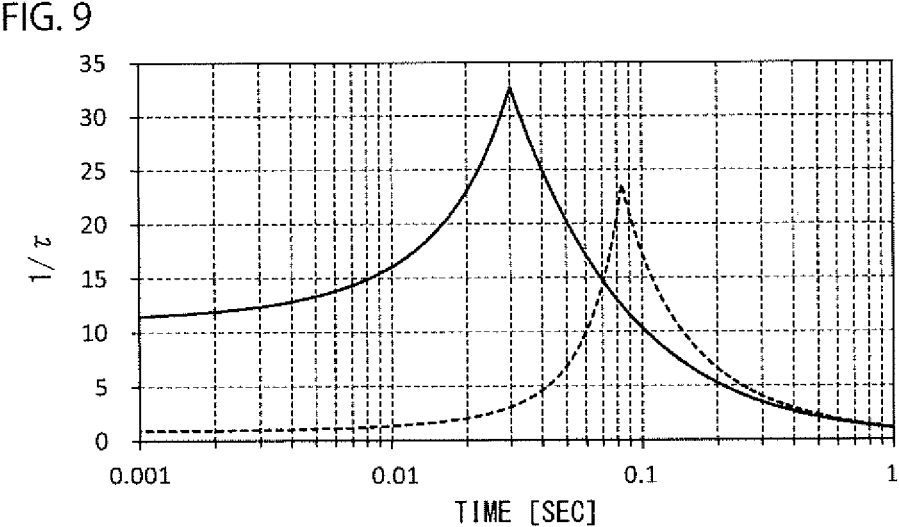
FIG. 9 is a graph of the relationship between the slow cooling time and a reciprocal ($1/\tau$) of a time constant $\tau$ of structural relaxation.

When $\Delta T^o$ is large, that is, when the temperature $T_g^o$ of the optical fiber at the start of slow cooling is low, it is possible to temporarily increase the temperature of the optical fiber in the annealing furnace 121 as described above. As seen in FIGS. 6 and 8, while the temperature of the optical fiber is increased in this manner, the degree of decrease in the fictive temperature $T_f$ is small, and after approximately 0.01 seconds from the start of slow cooling, the fictive temperature $T_f$ decreases conspicuously. In order to simply illustrate that the fictive temperature $T_f$ decreases even in the early phase of slow cooling when $\Delta T^o$ is large, FIG. 9 shows a relationship between an slow cooling time and a reciprocal $(1/\tau)$ of a time constant r of structural relaxation when $\Delta T^o=180°$ C. (solid line) and when $\Delta T^o=300°$ C. (broken line). FIG. 9 shows that, when $\Delta T^o=180°$ C., the time constant $\tau$ of the structural relaxation is about 0.06 seconds at 0.01 seconds after the start of slow cooling, and the time constant $\tau$ of the structural relaxation is the minimum value of 0.03 seconds at 0.03 seconds after the start of slow cooling. FIG. 9 shows that, when $\Delta T^o=300°$ C., the time constant $\tau$ of the structural relaxation is about 0.75 seconds at 0.01 seconds after the start of slow cooling, and the time constant $\tau$ of the structural relaxation is the minimum value of 0.04 seconds at 0.08 seconds after the start of slow cooling. Accordingly, even when $\Delta T^o$ exceeds 60° C., it is clear that the fictive temperature $T_f$ decreases from the early phase of slow cooling. These results show that, in a case where the optical fiber is to be temporarily heated in the annealing furnace 121, and when $\Delta T^o=180°$ C. or less, the heating time may be 0.01 seconds or more, or may be 0.04 seconds or less, and when $\Delta T^o$ exceeds 180° C., the heating time may be 0.04 seconds or more, or may be 0.2 seconds or less. Accordingly, when the temperature difference $\Delta T^o$ between the temperature $T_g^o$ of the optical fiber being drawn in the annealing furnace 121 and the fictive temperature $T_f^o$ of the glass included in the core of the optical fiber is higher than 60° C. and equal to 180° C. or less, it is possible to increase the temperature of the optical fiber to the preset temperature of the annealing furnace 121 within a time range from 0.01 to 0.04 seconds after the optical fiber is drawn in the annealing furnace 121 and then decreased. When the temperature difference $\Delta T^o$ between the temperature $T_g^o$ of the optical fiber being drawn in the annealing furnace 121 and the fictive temperature $T_f^o$ of the glass included in the core of the optical fiber is higher than 180° C. and equal to 300° C. or less, it is possible to increase the temperature of the optical fiber to the preset temperature of the annealing furnace 121 within a time range from 0.04 to 0.2 seconds after the optical fiber is drawn in the annealing furnace 121 and then decreased.

Figure 10:
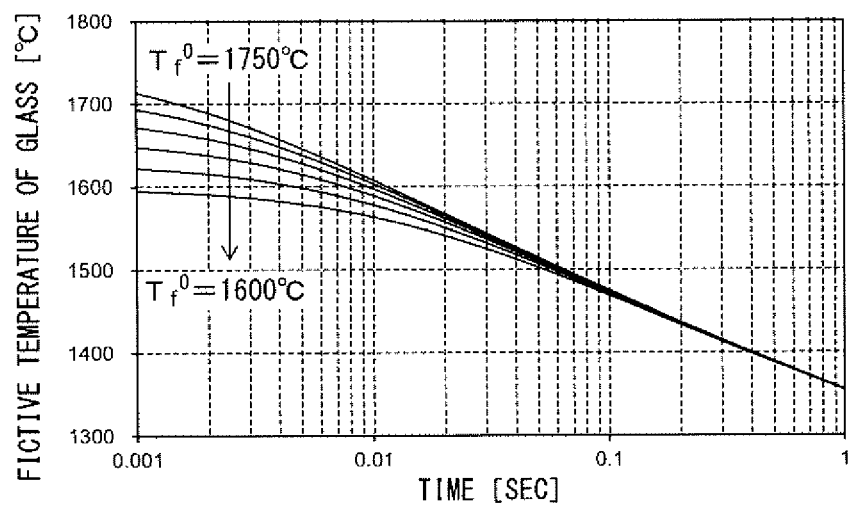
FIG. 10 is a graph of a time-dependent change in the fictive temperature of the glass when the fictive temperature of the glass at the start of slow cooling is changed from 1750° C. to 1600° C. in 30° C. increments.

Next, FIG. 10 shows time-dependent changes in the fictive temperature $T_f$ of the glass when the temperature difference $\Delta T^o$ at the start of slow cooling is kept constant at 60° C. and the fictive temperature $T_f^o$ of the glass at the start of slow cooling is changed from 1750° C. to 1600° C. in 30° C. increments. As similar to the results shown in FIG. 7, FIG. 10 shows that the lower the fictive temperature $T_f$ of the glass at the start of slow cooling becomes, the lower becomes the fictive temperature $T_f^o$ attainable by slow cooling. Furthermore, in a case where the fictive temperature $T_f^o$ at the start of slow cooling is 1600° C. or more, it is clear that, when roughly 0.1 seconds passes from the start of slow cooling, the fictive temperature $T_f$ tends to decrease almost in a similar manner.

In the aforementioned description, the calculation is carried out, supposing that an infinite number of ideal annealing furnaces are used and that a temperature of each annealing furnace is adjustable. However, in an actual apparatus for producing an optical fiber, a temperature of a finite number of annealing furnaces is set so as to change a temperature of an optical fiber in a staircase pattern. Accordingly, it is expected that time-dependent changes in temperature of the optical fiber in an actual slow cooling process P3 deviates from the ideal temperature changes and that a fictive temperature of the optical fiber does not decrease to the fictive temperature $T_f$ indicated by the aforementioned calculation result.

However, the results in FIGS. 5 to 8 show the following facts. That is, even with variation, to some extent, in the temperature $T_g^o$ of the optical fiber at the start of slow cooling, in the fictive temperature $T_f^o$ of the glass included in the core at the start of slow cooling, and in the temperature difference $\Delta T^o$ therebetween, slow cooling of the optical fiber for 0.01 seconds or more at an appropriate temperature as described above makes it possible to promote the reduction of the fictive temperature $T_f$. In other words, it is possible to promote the structural relaxation in the glass included in the core of the optical fiber. More specifically, if the temperature difference $\Delta T^o$ between the temperature $T_g^o$ of the optical fiber and the fictive temperature $T_f^o$ of glass included in the core of the optical fiber at the start of slow cooling is 300° C. or less by slowly cooling the optical fiber for 0.01 seconds or more to cause the optical fiber to have a temperature $T_g$ of 1300° C. or more and 1800° C. or less, it is possible to promote the structural relaxation in the glass included in the core. Accordingly, even though there is a certain amount of variation in the temperature $T_g^o$ of the optical fiber and the fictive temperature $T_f^o$ of the glass included in the core of the optical fiber at the start of slow cooling, it is possible to promote the structural relaxation in the glass included in the core. Promotion of the structural relaxation in the glass included in the core reduces scattering loss due to structural fluctuation in the glass included in the core when light is transmitted to the core, leading to reduction in transmission loss of the optical fiber.

In addition, it is clear that, when the temperature difference $\Delta T^o$ between the temperature $T_g^o$ of the optical fiber and the fictive temperature $T_f^o$ of the glass included in the core of the optical fiber at the start of slow cooling is 180° C. or less, slow cooling of the optical fiber for 0.1 seconds or more at an appropriate temperature as described above makes it possible to decrease the fictive temperature $T_f$ equally as compared with a case where the temperature difference $\Delta T^o$ at the start of slow cooling is about 60° C. which is considered to be the optimum slow cooling condition. Furthermore, the results in FIG. 10 show that, when the fictive temperature $T_f^o$ of the glass at the start of slow cooling is 1600° C. or more and 1750° C. or less due to slow cooling of the optical fiber for 0.1 seconds or more, it is possible to decrease the fictive temperature $T_f$ to a similar extent regardless of the fictive temperature $T_f^o$ of the glass at the start of slow cooling. When the temperature difference $\Delta T^o$ exceeds 180° C., the fictive temperature $T_f$ is decreased by slowly cooling the optical fiber for 0.1 seconds or more at an appropriate temperature as described above, but the fictive temperature is decreased to a level slightly higher than the case where the temperature difference $\Delta T^o$ at the start of slow cooling is about 60° C. which is considered to be the optimum slow cooling condition.

As described above, slow cooling of the optical fiber for 0.01 seconds or more makes it possible to promote the structural relaxation in the glass included in the core regardless of the temperature $T_g^o$ of the optical fiber and the fictive temperature $T_f^o$ of the glass at the start of slow cooling. In addition, slow cooling of the optical fiber for 0.1 seconds or more makes it possible to promote the structural relaxation in the glass included in the core to a similar extent regardless of the temperature $T_g^o$ of the optical fiber and the fictive temperature $T_f^o$ of the glass at the start of slow cooling. Note that the slow cooling time may be 0.1 seconds or more. Furthermore, it is possible that the optical fiber should be slowly cooled for 0.01 seconds or more so that the temperature becomes 1300° C. or more and 1700° C. or less, and it is possible that the optical fiber should be slowly cooled for 0.1 seconds or more so that the temperature becomes 1350° C. or more and 1500° C. or less.

It is possible to appropriately adjust the temperature difference $\Delta T^o$ between the temperature $T_g^o$ of the optical fiber to be drawn in the annealing furnace 121 and the fictive temperature $T_f^o$ of the glass included in the core. However, conditions for the adjustment depend on conditions such as the type of an optical fiber to be produced, a drawing speed, and tension of the optical fiber. For example, in order to optimize the arrangement of the drawing furnace 110 and the annealing furnace 121, it is possible that either one of them should be made movable. Alternatively, as in the above-described embodiments, it is possible to control the temperature $T_g^o$ of the optical fiber being drawn in the annealing furnace 121 and the fictive temperature $T_f^o$ of the glass included in the core by providing the precooling process P2 between the drawing process P1 and the slow cooling process P3.

<Rapid Cooling Process P4>

After the slow cooling process P3, the optical fiber is covered with a coating layer to enhance the resistance against external flaws, for example. Typically, this coating layer is formed of an ultraviolet curable resin. In order to form such a coating layer, it is necessary to sufficiently cool the optical fiber at a low temperature for preventing the coating layer from being burn, for example. The temperature of the optical fiber affects the viscosity of a resin to be applied, and as a result, this affects the thickness of the coating layer. A suitable temperature of the optical fiber in forming the coating layer is appropriately determined suitable for the properties of a resin forming the coating layer.

In the method for manufacturing an optical fiber according to one or more embodiments, not only the cooling rate is decreased by the annealing furnace 121 but also the annealing furnace 121 is provided between the drawing furnace 110 and a coater 131 to decrease the section for sufficiently cooling the optical fiber. More specifically, the method for manufacturing an optical fiber according to one or more embodiments also includes the precooling process P2, further decreasing the section sufficiently cooling the optical fiber. Thus, the method for manufacturing an optical fiber according to one or more embodiments includes the rapid cooling process P4 in which the optical fiber delivered out of the annealing furnace 121 is rapidly cooled using a cooling device 122. In the rapid cooling process P4, the optical fiber is rapidly cooled faster than in the slow cooling process P3. Since the rapid cooling process P4 performed in this manner is provided the temperature of the optical fiber can be sufficiently decreased in a shorter section, easily forming the coating layer. The temperature of the optical fiber when it is delivered out of the cooling device 122 ranges from temperatures of 40° C. to 50° C., for example.

As described above, the optical fiber, which has been passed through the cooling device 122 and cooled to a predetermined temperature, is passed through the coater 131 containing an ultraviolet curable resin to be the coating layer that covers the optical fiber, and the optical fiber is covered with this ultraviolet curable resin. The optical fiber is further passed through an ultraviolet irradiator 132, ultraviolet rays are applied to the optical fiber, the coating layer is formed, and then the optical fiber 1 is formed. Note that, the coating layer is typically formed of two layers. In the case of forming a two-layer coating layer, after the optical fiber is covered with ultraviolet curable resins forming the respective layers, the ultraviolet curable resins are cured at one time, and then the two-layer coating layer can be formed. Alternatively, after forming a first coating layer, a second coating layer may be formed. The direction of the optical fiber 1 is changed by a turn pulley 141, and then the optical fiber 1 is wound on a reel 142.

As described above, the above-described embodiments of the present invention are taken as one or more examples. The present invention is not limited to these embodiments. For example, the method for manufacturing an optical fiber according to one or more embodiments of the present invention only has to include the drawing process P1 and the slow cooling process P2 described above. The precooling process P3 and the rapid cooling process P4 may be not essential processes. The method for manufacturing an optical fiber according to one or more embodiments of the present invention is applicable to the production of any types of optical fibers. For example, the method for manufacturing an optical fiber according to one or more embodiments of the present invention is applicable also to production methods for optical fibers having different materials, such as chalcogenide glass and fluorine glass, as a principal component, as well as production methods for optical fibers having silica glass as a principal component, if the constant A and the activation energy $E_{act}$ in Equation (1) above are derived.

According to one or more embodiments of the present invention, there is provided a production method for an optical fiber with which an optical fiber with decreased transmission losses can be produced, and the method can be used in the field of optical fiber communications. The method can also be used for fiber laser devices and for producing optical fibers used in other devices using optical fibers.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

REFERENCE SIGNS LIST

1 . . . optical fiber
1P . . . optical fiber preform
110 . . . drawing furnace
111 . . . heating unit
120 . . . cylindrical body
121 . . . annealing furnace
122 . . . cooling device
131 . . . coating device
132 . . . ultraviolet irradiation device
141 . . . turning pulley
142 . . . reel
P1 . . . drawing process
P2 . . . precooling process
P3 . . . slow cooling process
P4 . . . rapid cooling process

The invention claimed is:

1. A method for manufacturing an optical fiber comprising:
drawing an optical fiber preform in a drawing furnace; and
cooling the optical fiber drawn in an annealing furnace;
wherein, when the optical fiber enters the annealing furnace, a temperature difference between a temperature of the optical fiber and a fictive temperature of glass in a core of the optical fiber is 300° C. or less,
the optical fiber is cooled for 0.01 seconds or more in the annealing furnace so that the temperature of the optical fiber becomes 1300° C. or more and 1800° C. or less, and
the temperature difference is higher than 60° C. and equal to 300° C. or less, and the temperature of the optical fiber is temporarily increased and then decreased in the annealing furnace.

2. The method for manufacturing an optical fiber according to claim 1, wherein the optical fiber is cooled in the annealing furnace for 0.1 seconds or more.

3. The method for manufacturing an optical fiber according to claim 1, wherein the optical fiber is cooled in the annealing furnace for 0.02 seconds or more so that the temperature of the optical fiber becomes 1450° C. or more and 1630° C. or less.

4. The method for manufacturing an optical fiber according to claim 1, wherein the optical fiber is cooled in the annealing furnace for 0.1 seconds or more so that the temperature of the optical fiber becomes 1350° C. or more and 1500° C. or less.

5. A method for manufacturing an optical fiber comprising:
drawing an optical fiber preform in a drawing furnace; and
cooling the optical fiber drawn in an annealing furnace;
wherein, when the optical fiber enters the annealing furnace, a temperature difference between a temperature of the optical fiber and a fictive temperature of glass in a core of the optical fiber is 300° C. or less,
the optical fiber is cooled for 0.01 seconds or more in the annealing furnace so that the temperature of the optical fiber becomes 1300° C. or more and 1800° C. or less, and
the temperature difference is higher than 60° C. and equal to 180° C. or less, and the temperature of the optical fiber is increased to a preset temperature of the annealing furnace for 0.001 to 0.1 seconds after the optical fiber enters the annealing furnace and then decreased.

6. The method for manufacturing an optical fiber according to claim 5, wherein the optical fiber is cooled in the annealing furnace for 0.1 seconds or more.

7. The method for manufacturing an optical fiber according to claim 5, wherein the optical fiber is cooled in the annealing furnace for 0.02 seconds or more so that the temperature of the optical fiber becomes 1450° C. or more and 1630° C. or less.

8. The method for manufacturing an optical fiber according to claim 5, wherein the optical fiber is cooled in the annealing furnace for 0.1 seconds or more so that the temperature of the optical fiber becomes 1350° C. or more and 1500° C. or less.

* * * * *